United States Patent [19]

Marten et al.

[11] Patent Number: 5,585,446

[45] Date of Patent: Dec. 17, 1996

[54] POLYEPOXIDE-POLYOXYALKYLENE MONOAMINE(S) PRODUCT WITH HARDENER

[75] Inventors: Manfred Marten, Mainz; Bernhard Wehner, Villmar, both of Germany

[73] Assignee: Hoechst Aktiengesellschaft, Frankfurt am Main, Germany

[21] Appl. No.: 355,303

[22] Filed: Dec. 12, 1994

[30] Foreign Application Priority Data

Dec. 15, 1993 [DE] Germany .................. 43 42 721.9

[51] Int. Cl.$^6$ .................. C08L 63/02; C08L 63/04
[52] U.S. Cl. .................. 525/523; 525/423; 525/481; 525/486; 525/526; 525/533; 528/111
[58] Field of Search .................. 528/111; 525/523, 525/533, 423, 481, 486, 526

[56] References Cited

U.S. PATENT DOCUMENTS

| | | | |
|---|---|---|---|
| 4,107,116 | 8/1978 | Riew et al. | 528/111.3 |
| 4,421,906 | 12/1983 | Waddill et al. | 528/111 |
| 4,423,170 | 12/1983 | Waddill | 523/417 |
| 4,486,555 | 12/1984 | Kordomenos et al. | 523/400 |
| 4,507,363 | 3/1985 | Chow et al. | 528/111 |
| 4,859,788 | 8/1989 | Brindoepke et al. | 558/398 |
| 4,886,845 | 12/1989 | Becker et al. | 523/403 |
| 5,032,629 | 7/1991 | Hansen et al. | 523/414 |
| 5,084,532 | 1/1992 | Schenkel | 525/524 |
| 5,364,909 | 11/1994 | Guo et al. | 525/69 |

FOREIGN PATENT DOCUMENTS

| | | |
|---|---|---|
| 2112410 | 1/1993 | Canada . |
| 0109174 | 5/1984 | European Pat. Off. . |
| 0166906 | 1/1986 | European Pat. Off. . |
| 0387418 | 9/1990 | European Pat. Off. . |
| 2936123 | 4/1981 | Germany . |

OTHER PUBLICATIONS

Derwent accession No. 114:144785 for European Application No. 387,418, Sep. 1990, Ruetgerwerke.

Derwent accession No. 120–334891 for WIPO Publication No. WO 93/24862, Dec. 1993, Agfa–Gevaert.

H. N. Vazirani, "Flexible Epoxy Resins", Adhesives Age, Oct. 1980, pp. 31–35.

*Primary Examiner*—Robert E. Sellers
*Attorney, Agent, or Firm*—Foley & Lardner

[57] ABSTRACT

An epoxy resin composition is disclosed that contains compounds that contain at least two 1,2-epoxide groups. The epoxide group-containing compounds are reaction products of compounds (A1) that contain at least two 1,2-epoxide groups per molecule, compounds (A2) that are polyoxyalkylenemonoamines that have a molecular weight of from 130 to 900 and, if desired, polyoxyalkylenemonoamines (A3) that have a molecular weight of from 900 to 5000 and/or polycarboxylic acids (A4). The resin composition additionally contains at least one hardener (B) and, if desired, customary additives (C).

24 Claims, No Drawings

POLYEPOXIDE-POLYOXYALKYLENE MONOAMINE(S) PRODUCT WITH HARDENER

BACKGROUND OF THE INVENTION

The present invention relates to an elastic epoxy resin hardener system. Epoxy resins, in particular those which are prepared from bisphenol A and epichlorohydrin, are known raw materials for the preparation of high-quality casting resins, coating compositions and adhesives. These aromatic epoxy resins, may be cured by means of polyamines, and possess, besides good chemical and solvent resistance, good adhesion to many substrates. The usability of these resin/hardener systems is often limited by insufficient elasticity or flexibility in the cross-linked state. In particular for applications in which temperature-change stresses have to be taken up by a high elasticity of the coating materials, the elasticity of the unmodified standard epoxy resin systems is insufficient. In the adhesives sector, there is a need for epoxy resin systems which are still sufficiently elastic at low temperatures, i.e. below 0° C. In the automobile industry, use is made of epoxy resin adhesives which are only slightly flexible in the cured state. Although the adhesive bonds obtained with these resins have a high tensile shear strength, they easily separate by peeling under a lateral force. It is a known problem that adhesives which allow high tensile shear strengths to be achieved frequently give only a low angle peeling strength.

In adhesive bonding of metal sheets in the automobile industry, a procedure frequently used during basic body construction is first to apply the adhesive warm to oiled bright metal sheets, but not to cure it at this stage. On cooling, the adhesive solidifies. In the manufacturing process the prefabricated parts or the basic vehicle bodies are treated to remove the rolling grease in washing, phosphating and cataphoretic immersion-finish baths prior to curing in an oven. There is, therefore, a need for adhesives which have sufficient wash-out resistance even prior to curing. In particular, the cured adhesive system has to sufficiently protect the bright metal sheet against corrosion under the point of adhesion.

In principle, the elasticity of epoxy resin systems can be increased externally by addition of plasticizer or internally by reducing the crosslinking density. External elasticizing agents are not reactive and are not incorporated into the thermoset network. This type of modification is limited to specific application areas, since it has a series of disadvantages. These additives lead to considerable disruption of the thermoset structure, are limited in their plasticizing effect at low temperatures, tend to sweat out on thermal stressing and aging and result in cured systems that are brittle. To internally increase the elasticity, additions are made of compounds which react with the epoxy resins or hardeners and are incorporated in the crosslinking. In detail, the elasticizing action is achieved by incorporation of long-chain aliphatic or strongly branched additives into the resin or hardener component.

Vazirani [Adhesives Age, Oct. 1980, pp. 31–35] describes flexible single-component and two-component epoxy resin systems based on polyoxypropylenediamines and polyoxypropylenetriamines. These amines are commercially available from Texaco under the trade name "Jeffamine®". The curing of the single-component system is carried out using dicyandiamide.

EP-B 0 354 498 discloses a reactive melt adhesive which contains a resin component, at least one thermally activatable latent hardener for the resin component and, if desired, accelerators, fillers, thixotropes and further customary additives. The resin component is obtained by reaction of (a) an epoxy resin which is solid at room temperature and (b) an epoxy resin which is liquid at room temperature together with (c) a linear polyoxypropylene having amino end groups.

The resins which are solid at room temperature are ones which for further processing have to be heated to above 50° C. so as to lower the viscosity sufficiently for incorporation of further constituents of the melt adhesive to be made possible. In the reaction of the epoxy resins with the linear polyoxypropylene having amino end groups, a large excess of epoxide groups, based on the amino groups, is required so that the amino groups are completely reacted. A 5-fold to 10-fold excess is typical.

WO 93/00381 describes a further development of EP-B 0 354 498 that has improved low-temperature properties. The amino component comprises linear amino-terminated polyethylene glycols or linear and/or trifunctional amino-terminated polypropylene glycols.

U.S. Pat. No. 4,423,170 discloses water-dilutable epoxy resin compositions which comprise (A) diepoxides that are obtained by reaction of diepoxides and polyoxyalkylenamines that have a molecular weight of from 900 to 2500, and (B) a latent hardener in aqueous medium.

To ensure sufficient water solubility of the system, the polyoxyalkyleneamines have to have high proportions of ethylene oxide. Epoxy resin systems built up using such amines do not give sufficient corrosion resistance when used as adhesives, for example, in the automobile industry.

EP-B 0 109 174 describes an epoxy resin composition that contains (A) a polyepoxide and (B) a hardener, wherein the polyepoxide has been reacted with from 50 to 70% by weight of a polyoxyalkylenemonoamine that has a molecular weight of from 900 to 2000. The resin-hardener mixture described in this document can be used as a flexible adhesive in the form of a single-component or two-component system, has a low viscosity and can therefore be used without addition of solvent. It is disclosed that only one series of adducts, namely those prepared from Jeffamine M-1000, shows a uniformly low viscosity independent of the amine content. In addition, it is pointed out that compositions containing less than 50% of polyoxyalkylenemonoamine have a relatively low flexibility at a high viscosity and compositions containing more than 70% of polyoxyalkylenemonoamine have relatively low adhesive strength and decreasing viscosity.

SUMMARY OF THE INVENTION

It is an object of the present invention to provide reactive, flexible adhesives which have high peeling strength not only at room temperature but also at low temperatures, e.g. of 0° C. and lower. At the same time, the tensile shear strength values should not be impaired. Sufficient wash-out resistance and good corrosion protection of the cured adhesive system are to be ensured. It is advantageous if the epoxy resins have viscosities which make possible easy processing without requiring additional apparatus.

These and other objects according to the invention are provided by an epoxy resin composition comprising
(A) a compound that contains at least two 1,2-epoxide groups and that is a reaction product of:
    (A1) a compound that contains at least two 1,2-epoxide groups per molecule, and (A2) a polyoxyalkylenemonoamine that has a number average molecular weight between 130 and 900, and, optionally, one or both of (A3) a polyoxyalkylenemonoamine that has a molecular weight of from 900 to 5000, and (A4) a polycarboxylic acid, and (B) a hardener.

Preferably, the oxyalkylene groups in (A2) and (A3) are selected from oxypropylene, oxyethylene and their mixtures.

In a particularly preferred embodiment, one or both of polyoxyalkylenemonoamine (A2) and polyoxyalkylenemonoamine (A3) are polyoxypropylenemonoamines.

The present invention further provides a method of bonding two materials, comprising the steps of coating a layer of the inventive composition on a surface of a first material and contacting the coated surface of the first material with a surface of a second material. The surface of the second material additionally may be coated with a layer of the composition in this process. In particular, the two materials may be parts of an automobile.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

It has now surprisingly been found that excellent corrosion-resistant flexible adhesive bonds can be achieved by curing of epoxy resins which are obtained by reacting 1,2-epoxides with polyoxyalkylenemonoamines that have molecular weights of below 900.

The present invention accordingly provides epoxy resin compositions comprising (A) compounds that contain at least two 1,2-epoxide groups and are reaction products of (A1) compounds that contain at least two 1,2-epoxide groups per molecule (A2) polyoxyalkylenemonoamines that have a molecular weight of from 130 to 900 and, if desired, of (A3) polyoxyalkylenemonoamines that have a molecular weight of from 900 to 5000 and, if desired, of (A4) polycarboxylic acids and (B) hardeners and (C) if desired, customary additives.

Suitable epoxide components (A1) are many compounds known for this purpose which contain on average more than one epoxide group, preferably two epoxide groups, per molecule. These epoxide compounds (epoxy resins) can be either saturated or unsaturated. They can be aliphatic, cycloaliphatic, aromatic or heterocyclic, and may contain hydroxyl groups. They can contain substituents which do not cause any interfering secondary reactions under the mixing or reaction conditions, for example, alkyl or aryl substituents, ether groups and the like. Preferably these compounds are glycidyl ethers which are derived from polyhydric phenols, in particular, bisphenols and novolaks and whose epoxide equivalent weights are between 150 and 500, but in particular between 150 and 250.

The polyhydric phenols are aromatic compounds that contain two or more hydroxyl groups. The aromatic compounds are monocyclic or polycyclic aromatics, or compounds in which a plurality of such aromatics are connected by direct bonds or divalent groups such as ether, ketone, sulfide, sulfone, carboxylic ester or carboxamide groups.

Examples of polyhydric phenols which may be mentioned include: resorcinol, hydroquinone, 2,2-bis(4'-hydroxyphenyl)propane (bisphenol A), mixtures of isomers of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, bis(4'-hydroxyphenyl)-1,1-ethane, bis(4'-hydroxyphenyl)-1,1-isobutane, bis(4'-hydroxy-tert-butylphenyl)-2,2-propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulfone, inter alia, and also the chlorination and bromination products of the above mentioned compounds. Very particular preference is given to liquid diglycidyl ethers based on bisphenol A that have an epoxide equivalent weight of from 180 to 190.

It also is possible to use polyglycidyl ethers of polyalcohols, such as ethanediol 1,2-diglycidyl ether, propanediol 1,2-diglycidyl ether, propanediol 1,3-diglycidyl ether, butanediol diglycidyl ether, pentanediol diglycidyl ether (also neopentyl glycol diglycidyl ether), hexanediol diglycidyl ether, diethylene glycol diglycidyl ether, dipropylene glycol diglycidyl ether, higher polyoxyalkylene glycol diglycidyl ethers such as higher polyoxyethylene glycol diglycidyl ethers and polyoxypropylene glycol diglycidyl ethers, mixed polyoxyethylene-propylene glycol diglycidyl ethers, polyoxytetramethylene glycol diglycidyl ethers, polyglycidyl ethers of glycerol, trimethylolpropane, trimethylolethane, pentaerythritol, sorbitol, polyglycidyl ethers of alkoxylated polyols, such as glycerol, trimethylolpropane, pentaerythritol, etc., diglycidyl ethers of bis(hydroxymethyl)cyclohexane, bis(4-hydroxycyclohexyl)methane and 2,2-bis(4-hydroxycyclohexyl)propane, polyglycidyl ethers of castor oil, triglycidyltris(2-hydroxyethyl)isocyanurate. Preference is given to using polyoxypropylene glycol diglycidyl ethers that have an epoxide equivalent weight of from 150 to 800, in particular from 300 to 400.

In particular cases, small amounts of reactive diluents also can be used in addition to the polyglycidyl ethers. Examples of such diluents include methyl glycidyl ether, butyl glycidyl ether, allyl glycidyl ether, ethylhexyl glycidyl ether, long-chain aliphatic glycidyl ethers such as cetyl glycidyl ether and stearyl glycidyl ether, monoglycidyl ethers of a higher isomeric alcohol mixture, glycidyl ether of a mixture of $C_{12}$ to $C_{13}$ alcohols, phenyl glycidyl ether, cresyl glycidyl ether, p-t-butylphenyl glycidyl ether, p-octylphenyl glycidyl ether, p-phenylphenyl glycidyl ether, glycidyl ether of an alkoxylated lauryl alcohol, etc. in amounts of up to 30%, preferably 10–20%, based on polyglycidyl ether.

Further suitable compounds are poly(N-glycidyl) compounds which are obtainable by dehydrohalogenation of the reaction products of epichlorohydrin and amines such as aniline, n-butylamine, bis(4-aminophenyl)methane, m-xylylenediamine or bis(4-methylaminophenyl)methane. However, the poly(N-glycidyl) compounds also include triglycidyl isocyanurate, N,N'-diglycidyl derivatives of cycloalkylene ureas and diglycidyl derivatives of hydantoins, etc.

Use also can be made of polyglycidyl esters of polycarboxylic acids, which are obtained by reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, 2,6-naphthalenedicarboxylic acid and higher dicarboxylic acid diglycidyl esters, such as dimerized or trimerized linolenic acid. Examples are diglycidyl adipate, diglycidyl phthalate and diglycidyl hexahydrophthalate.

A comprehensive listing of suitable epoxide compounds is given in the handbook "Epoxidverbindungen und Epoxidharze" by A. M. Paquin, Springer Verlag, Berlin 1958, chapter IV, and in Lee Neville "Handbook of Epoxy Resins", 1967, chapter 2. Furthermore, reference is here made to EP-A 272 595 and 286 933. Mixtures of a plurality of epoxy resins can also be used.

The polyoxyalkylenemonoamines which have been found to be particularly useful for forming the epoxides (A) are compounds of the formula

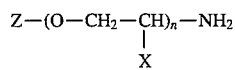

where X is hydrogen, a methyl or ethyl radical, Z is a hydrocarbon radical having from 1 to 5 carbon atoms, and n is an average which lies between 2 and 50.

Preference is given to polyoxyalkylenemonoamines of the formula:

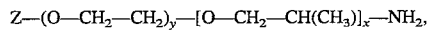

where Z is a hydrocarbon radical having from 1 to 5 carbon atoms, in particular a methyl radical, and, independently of one another, y is from 0 to 10 and x is from 1 to 41. Preferably, one or both of polyoxyalkylenemonoamine (A2) and (A3) have the formula

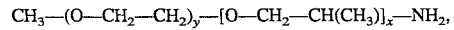

where, independently of one another, y is from 0 to 10 and x is from 1 to 41.

As component (A2), preference is given to using polyoxyalkylenemonoamines of the formula:

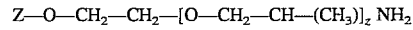

where z is from 1 to 15, in particular 9. Preferably, polyoxyalkylenemonoamine (A2) has a molecular weight between about 500 and 700 g/mol.

Some selected representatives of the above-described monoamine block copolymers that contain oxyethylene and oxypropylene groups are sold, for example, by Texaco Chemical Co., Inc. under the trade name ®Jeffamine M series. Particular mention may here be made of the ®Jeffamine grades M 600, M 1000, M 2005 and M 2070.

The polycarboxylic acids (A4) which also are used, if desired, are preferably long-chain dicarboxylic acids. Examples which may be mentioned are aliphatic dicarboxylic acids in which the aliphatic radical generally contains from 1 to 50, preferably from 2 to 44, carbon atoms, such as succinic acid, glutaric acid, adipic acid, suberic acid, azelaic acid, sebacic acid and dodecanoic acid. Suitable cycloaliphatic carboxylic acids whose cycloaliphatic radical usually comprises from 5 to 12, preferably from 6 to 8, carbon atoms are, for example, the various cyclohexanedicarboxylic acid isomers, hexahydrophthalic acid and tetrahydrophthalic acid.

Preference is given to using dimeric fatty acids which are prepared from monounsaturated or polyunsaturated natural or synthetic monobasic aliphatic fatty acids that have from 16 to 22 carbon atoms, preferably 18 carbon atoms, by known methods such as thermal or catalytic polymerization or by copolymerization in the presence of polymerizable compounds such as styrene or homologs, cyclopentadiene, etc. Particular preference is given to using dimeric fatty acids that have an acid number of from 150 to 230 mg KOH/g.

The components (A4) also can be dicarboxylic acids containing oxyalkylene, preferably oxyethylene groups, and that have the formula:

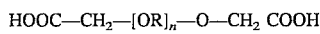

where R is a branched or unbranched alkylene radical having from 2 to 5, preferably 2, carbon atoms and n is 0 or an integer from 1 to 300, preferably from 1 to 50 and in particular from 1 to 25. Examples of these compounds include: 3,6-dioxaoctanedioic acid, 3,6,9-trioxaundecanedioic acid, polyglycol dicarboxylic acid that have a molecular weight of about 400, preferably of about 600, or mixtures of these acids. The preparation of these compounds is known (for example DE-A 2 936 123) and is carried out, for example, by oxidation of polyglycols in the presence of catalysts.

The epoxide compounds of the invention (component A) can be prepared by reacting the epoxides (A1) with the polyalkylenemonoamines (A2) and (A3) while stirring and generally while heating until the theoretically calculated epoxide equivalent weight is reached, that is, until all active hydrogens of the polyoxyalkylenemonoamine have reacted with the excess of epoxide groups present. The reaction temperatures are generally kept at from 25° to 200° C., preferably at from 50° to 150° C., in particular at from 80° to 130° C. Depending on the temperature and the epoxides and amines used, the reaction times are generally between a few minutes and a number of hours. In most cases no additional catalysts are required for quantitative reaction of the amines with the epoxides.

In the preparation of the epoxide compounds (A) of the invention, it is also possible to use various epoxides (A1) as a mixture and react them directly with polyoxyalkylenemonoamines (A2) and, if desired, (A3). It is also possible to carry out a targeted, stepwise build-up using various epoxides successively by first reacting an epoxide I (A1) with an excess of the polyoxyalkylenemonoamines, e.g. 2 active amine hydrogens per epoxide equivalent, and, after complete reaction of the epoxide groups of the epoxide I, reacting a further epoxide II (A1) in excess with the active amine hydrogens still available.

Any modification to be carried out using the polycarboxylic acids (A4) is usually carried out by reaction of the epoxide (A1) with the acid component (A4) prior to the reaction with the monoamines (A2) and (A3), but can in principle also be carried out after the epoxide (A1)-amine (A2 and (A3) reaction.

Preferably, the composition comprises from 20 to 80% by weight of component (A2) and, optionally, from 20 to 50% by weight of component (A3) and from 0.1 to 30% by weight of the component (A4), based on component (A1).

The reaction of the polycarboxylic acid (A4) with the epoxide compounds (A1) or the adduct of (A1), (A2) and, if desired, (A3) can be carried out at elevated temperatures without catalysts, but proceeds substantially more quickly and gives much lower residual acid numbers if catalysts are used.

Examples of catalysts which can be used for the targeted and accelerated reaction of the carboxyl groups of the component (A4) and the epoxide groups of the component (A1) or the reaction product of the component (A1) with the components (A2) and (A3) include: sodium hydroxide, potassium hydroxide, lithium hydroxide, sodium carbonate, chromium compounds such as $CrCl_3$, $CrO_3$, chromium acetylacetonate, imidazoles, imidazolines, quaternary ammonium and phosphonium compounds such as benzyltrimethylammonium chloride, tetraethylammonium chloride, tetramethylammonium chloride, benzyltrimethylammonium hydroxide, benzyldodecyldimethylammonium chloride, methyltriphenylphosphonium iodide, triphenyl(2,5-dihydroxyphenyl)phosphonium hydroxide, ethyltriphenylphosphonium acetate, triphenylethylphosphonium bromide and also organic phosphines such as triphenylphosphine, tricyclohexylphosphine, tributylphosphine, cyclohexyloctylphosphine, furthermore aromatic amines such as N,N-dimethylaniline, N,N-diethylaniline, N,N-dimethyl-p-toluidine, N,N-diethyl-p-toluidine and also amines such as triethylamine, tributylamine, benzyldimethylamine, benzyldiethylamine, triethylenediamine, N-methylmorpholine, N-methylpiperidine, N-alkylamines such as n-butylamine and alkanolamines such as diethanolamine, dimethylethanolamine, diethylethanolamine, dibutylethanolamine, triethanolamine, triisopropanolamine, methyldiethanolamine, di(3-phenoxy-2-hydroxypropyl)alkylamines such as di(3-phenoxy-2-hydroxypropyl)-n-butylamine, etc. These catalysts are generally used in amounts of from 0.01 to 5%, preferably from 0.05 to 2%, based on the weights of (A1) to (A4).

The component (B) used can be, for a two-component process, any known amine hardener for 1,2-epoxides. Examples which may be mentioned include: aliphatic amines such as the polyalkylenepolyamines, diethylenetriamine and triethylenetetramine, trimethylhexamethylenediamine, 2-methylpentanediamine (Dytek A), oxyalkylenepolyamines such as polyoxypropylenediamine and polyoxypropylenetriamine and 1,13-diamino-4,7,10-trioxatridecane, cycloaliphatic amines such as isophoronediamine (3,5,5-trimethyl-3-aminomethylcyclohexylamine), 4,4'-diaminodicyclohexylmethane, 3,3'-dimethyl-4,4'-diaminodicyclohexylmethane, N-cyclohexyl-1,3-propanediamine, 1,2-diaminocyclohexane, piperazine, N-aminoethylpiperazine, TCD-diamine (3(4), 8(9)-bis(aminomethyl)tricyclo[5.2.1.0$^{2,6}$]decane), araliphatic amines, such as xylylenediamines, aromatic amines such as phenylenediamines, 4,4'-diaminodiphenylmethane, etc., adduct hardeners which are the reaction products of epoxide compounds, in particular glycidyl ethers of bisphenol A and F, with excess amine, polyamidoamine hardeners which are obtained by condensation of monocarboxylic and polycarboxylic acids with polyamines, in particular by condensation of dimeric fatty acids with polyalkylenepolyamines, Mannich-base hardeners which are obtained by reaction of monohydric or polyhydric phenols with aldehydes, in particular formaldehyde, and polyamines.

Particularly preferred hardeners for the two-component procedure are Mannich bases, for example, based on phenol, formaldehyde and m-xylylenediamine and also N-aminoethylpiperazine and mixtures of N-aminoethylpiperazine with nonylphenol.

Use of single-component systems is often desired, since the processor does not have to carry out mixing of individual components directly before use of the system, for example, as an adhesive. Single-component systems are obtained by mixing the epoxide component (A) with a latent hardener. Such mixtures generally have a storage stability of a number of weeks or months at room temperature, i.e. the viscosity remains constant or rises only slightly over this period of time. One of the widely used latent hardeners is dicyandiamide. Dicyandiamide (cyanoguanidine, e.g. ®Dyhard 100 SKW) is itself not a hardener at room temperature. It decomposes at elevated temperatures and effects a hardening of the epoxy system via reactive dissociation products. Flexible single-component epoxy resin systems are prepared by dispersion of the latent hardener, for example the dicyandiamide, as component (B) in the flexibilized epoxy resin component (A), if desired together with additives (C) such as, for example, a thixotrope.

The hardeners (B) generally are used in amounts of from 0.01 to 50, preferably from 1 to 40%, by weight, based on the component (A). Curing with dicyandiamide is generally carried out using amounts of from 0.01 to 20, preferably from 0.5 to 15%, by weight, based on the component (A). If desired, an accelerator can be added in an amount of from 0.01 to 10 preferably from 0.1 to 7%, by weight, based on the component (A) (cf. additives (C), accelerator).

During the incorporation of the hardeners (B) and during the addition of any accelerators (cf. additives (C), accelerator), the temperature should be below the reaction temperature of the respective resin/hardener system. It can here become necessary to cool the reaction mixture during the dispersion process.

Using the polyamine hardeners specified for the two-component process, it is possible in principle to cure the components (A) and (B) at room temperature. However, these relatively low temperatures frequently do not give optimum properties of the cured system. For the single-component system using latent hardeners, such as dicyandiamide, an elevated temperature is required in any case for initiating the crosslinking reaction. The curing temperature of the composition of the invention is generally from 5° to 260° C., preferably from 120° to 200° C. The curing time at temperatures of from 120° to 200° C. is generally from 10 to 200 minutes.

Besides the components (A) and (B), the composition of the invention can contain further customary additives such as accelerators or curing catalysts, further hardeners and additional curable resins or extender resins and also the customary surface coating additives such as pigments, pigment pastes, dyes, antioxidants, leveling agents or thickeners (thixotropes), antifoaming agents and/or wetting agents, reactive diluents, fillers, plasticizers, flame retardants and the like. These additives can be added to the curable mixtures either some time before or just directly before processing.

The accelerators used, in particular for curing by the two-component process using amine hardeners, can be, for example, phenols and alkylphenols having 1–12 carbon atoms in the alkyl group, cresol, the various xylenols, nonylphenol, polyphenols such as bisphenol A and F, OH-containing aromatic carboxylic acids such as salicylic acid, m-hydroxybenzoic acid, p-hydroxybenzoic acid and tertiary amines such as benzyldimethylamine, 1,3,5-tris(dimethylamino)phenol and the like.

It is frequently also necessary to accelerate the curing in the single-component process using latent hardeners such as dicyandiamide. Suitable accelerators which may be mentioned include tertiary amines such as benzyldimethylamine, 1,4-diazabicyclo[2.2.2]octane (Dabco), N,N-dimethylethanolamine are, 2,4-dimethylpyridine, 4-dimethylaminopyridine, substituted ureas, $BF_3$-amine complexes, quaternary ammonium compounds such as benzyltrimethylammonium chloride, tetramethylammonium chloride, tetraethylammonium chloride, benzyldodecyldiethylammonium chloride and, in particular, imidazolines and imidazoles.

In detail, suitable imidazolines or imidazoles are, for example, the following compounds: 2-methylimidazoline, 2-ethyl-4-methylimidazoline, 2-phenylimidazoline, 2-undecylimidazoline, 2-heptadecylimidazoline, 2-ethylimidazoline, 2-isopropylimidazoline, 2,4-dimethylimidazoline, 2-phenyl-4-methylimidazoline, 2-benzylimidazoline, 2-(o-Tolyl)imidazoline, 2-(p-Tolyl)imidazoline, tetramethylenebisimidazoline, 1,1,3-trimethyl-1,4-tetramethylenebisimidazoline, 1,3,3-trimethyl-1,4-tetramethylenebisimidazoline, 1,1,3-trimethyl-1,4-tetramethylenebis-4-methylimidazoline, 1,2-phenylenebisimidazoline, 1,3-phenylenebisimidazoline, 1,4-phenylenebisimidazoline, 1,4-phenylenebis-4-methylimidazoline. It is also possible to use any desired mixtures of the imidazolines.

Suitable imidazoles are imidazole itself, 1-methylimidazole, 2-methylimidazole, 4-methylimidazole, 5-methylimidazole, 1-ethylimidazole, 2-ethylimidazole, 1-propylimidazole, 2-propylimidazole, 2-isopropylimidazole, 1-butylimidazole, 2-octylimidazole, 2-undecylimidazole, 2-heptadecylimidazole, 2-cyclohexylimidazole, 1-phenylimidazole, 2-phenylimiidazole, 2,4-dimethylimidazole, 1,2-dimethylimidazole, 4,5-dimethylimidazole, 2-ethyl-4-methylimidazole, 1-ethyl-2-methylimidazole, 1-methyl-2-isopropylimidazole, 4-butyl-5-ethylimidazole, 2-cyclohexyl-4-methylimidazole, 1-benzyl-2-methylimidazole, 2-phenyl-4-methylimidazole, 4,5-diphenylimidazole, 2-ethyl-4-phenylimidazole, 2,4,5-trimethylimidazole, 2,4,5-tricyclohexylimidazole, 1,2,4,5-tetramethylimidazole and benzimidazoles and derivatives thereof. It is also possible to use any desired mixtures of the imidazoles.

Leveling agents which can be used are, for example, acetals such as polyvinylformal, polyvinylacetal, polyvinylbutyral, polyvinylacetobutyral, etc., polyethylene and polypropylene glycols, silicone resins, mixtures of zinc soaps, of fatty acids and aromatic carboxylic acids, in particular commercial products based on polyacrylates. The leveling agents also can be added to the component (A) in amounts of 0.1–4% by weight, preferably 0.2–2.0% by weight.

As coupling agents and hydrophobicizing agents, use can be made of silanes. These can react both with the inorganic substrate and also with the organic polymer (adhesive, coating composition or the like) to form strong bonds. The improved adhesion can improve the mechanical properties, in particular after exposure to moisture. Appropriate products are offered, for example, under the name Dynasylan® from Hüls AG or as silanes by Degussa AG.

The dyes and pigments can be either inorganic or organic in nature. Examples which may be mentioned include titanium dioxide, zinc oxide, carbon black, conductivity black such as, for example, ®Printex XE 2 from Degussa AG. The organic dyes and pigments should be stable at the curing temperatures and should not to lead to any unacceptable shift in shade of color.

Suitable fillers are, for example, quartz flour, silicates, chalk, gypsum, kaolin, mica, barite, organic fillers such as, for example, polyamide powder and the like. Thixotropes and thickeners which can be used are, for example, Aerosil® (a finely divided silicon dioxide, e.g. the grades 150, 200, R 202, R 805 from Degussa), bentonite types (e.g. ®Sylodex 24 from Grace) and Bentone (Trademark of NL Chemicals).

The incorporation of the additives and fillers generally is carried out using forcing mixers such as dissolvers and compounders. Here too, it can be necessary to avoid premature reaction of the components by cooling the formulated resin/hardener system of the invention.

The epoxy resin composition of the invention can be used for coating and adhesive bonding of a great variety of materials, for example, metals, light metals, and also non-metallic materials such as ceramic, glass, leather, rubber, wood, plastic, etc. The materials can be bonded adhesively to the same or other materials.

The application to the substrate is carried out by known methods, for example by painting, rolling and deposition as a bead of adhesive from suitable machines.

EXAMPLES

I. Preparation of the epoxide compounds
(component A)

Example 1 (Comparison)

In a four-neck flask fitted with stirrer, thermometer and condenser, 70 parts by weight of ®Jeffamine M 1000[1]) were added under nitrogen to 100 parts by weight of a liquid epoxy resin based on bisphenol A and having an epoxide equivalent (EV) of 183. The mixture was then heated to 90° C. and kept at this temperature until the EV remained constant (about 5 hours). After a further holding time of 1 hour, the mixture was cooled and the flask was emptied. The epoxy resin had the following properties:

| Epoxide equivalent | 405 |
| Amine number | 22.4 mg KOH/g |
| Viscosity at 25° C. | 7500 mPa.s |

Example 2

Using a method similar to that of Example 1, 100 parts by weight of the liquid epoxy resin based on bisphenol A and having an EV of 183 was reacted with 43.5 parts by weight of ®Jeffamine M 600[2]). The epoxy resin had the following properties:

| Epoxide equivalent | 361 |
| Amine number | 31.8 mg KOH/g |
| Viscosity at 25° C. | 44260 mPa.s |

Notes:
1) ®Jeffamine M 1000 has, according to the manufacturer's leaflet, a molecular weight of 1000 and a PO/EO ratio of 3/19.
2) ®Jeffamine M 600 has, according to the manufacturer's leaflet, a molecular weight of 600 and a PO/EO ratio of 9/1.

Example 3

Using a method similar to that in Example 1, 100 parts by weight of the liquid epoxy resin based on bisphenol A and having an EV of 183 were reacted with 48.3 parts by weight of ®Jeffamine M 600 and 24.1 parts by weight of ®Jeffamine M 1000. The epoxy resin had the following properties:

| Epoxide equivalent | 525 |
| Amine number | 36.9 mg KOH/g |
| Viscosity at 25° C. | 42170 mPa.s |

Example 4

In a four-neck flask fitted with stirrer, thermometer and condenser, 5 parts by weight of the dimeric fatty acid Pripol 1004 (C 44 dimeric acid from Unichema International) were added under nitrogen to 95 parts by weight of a liquid epoxy resin based on bisphenol A and having an epoxide equivalent of 183. The reaction mixture was heated to 140° C. and 0.1 part by weight of triethanolamine was added. After 1 hour, the acid number was 0.1 mg KOH/g. The mixture was cooled to room temperature under nitrogen and the flask was emptied. The epoxy resin had the following properties:

| Acid number | 0.1 mg KOH/g |
|---|---|
| Epoxide equivalent | 199 |
| Viscosity at 25° C. | 12100 mPa.s |

Example 5

Using a method similar to that in Example 1, 100 parts by weight of the liquid epoxy resin from Example 4 having an EV of 199 were reacted with 36.2 parts by weight of ®Jeffamine M 600. The epoxy resin had the following properties:

| Epoxide equivalent | 366 |
|---|---|
| Viscosity at 25° C. | 47620 mPa.s |

Example 6

Eighty parts by weight of the epoxy resin from Example 5 were mixed with 20 parts by weight of a polyoxypropylene glycol diglycidyl ether (Hoechst Beckopox EP 075). The epoxy resin mixture had an EV of 361.

II. Preparation of single-component adhesives

The epoxy resin component A was heated to 60° C. and the dicyandiamide (Dyhard® 100 SKW Trostberg) was dispersed in this resin for 15 minutes using a dissolver at 10000 revolutions/minute. The ®Aerosil R202 subsequently was added in portions and, depending on the viscosity of the component (A), the mixture of the invention was homogenized at from 250 to 4000 revolutions/minute using the dissolver.

The epoxide compounds (component A) from the Examples I. 1, 2, 3, 5 and 6 were used to make up the adhesive formulations II. 1, 2, 3, 4 and 5 (see Table 1).

TABLE 1

Composition of the adhesives

| Example II | | 1 (Comparison) | 2 | 3 | 4 | 5 |
|---|---|---|---|---|---|---|
| Epoxy resin component A from Example I | Parts by weight | 1 100 | 2 100 | 3 100 | 5 100 | 6 100 |
| ® Dyhard 100 (Dicyandiamide from SKW Trostberg) | Parts by weight | 10 | 10 | 10 | 10 | 10 |
| ® Aerosil R202 (Degussa AG) | Parts by weight | 4 | 4 | 4 | 4 | 4 |

III. Test methods

1. Preparation of the test specimens for measuring the tensile shear strength

The tensile shear test specimens are produced in accordance with DIN 53 281 Part 2 from steel sheet grade ST 1405 having a thickness of 0.75 mm. The steel strips are, without having been degreased, adhesively bonded on an overlapping area of 400 mm$^2$. Spacers of PTFE film are used to obtain a defined adhesive layer of 0.2 mm. The adhesive is cured for 30 minutes at 180° C. After cooling the test specimen, adhesive which has exuded out the side is cut off.

2. Measurement of the tensile shear strength

The tensile shear strength of the test specimens made in accordance with III.1. is measured in accordance with DIN 53 283 as the mean of 5 individual values on a tensile tester in accordance with DIN 51 221, Part 2, from Zwick.

3. Preparation of the test specimens for the salt spray test

The test specimens prepared in accordance with III.1. are, without degreasing, primed twice using a two-component epoxy resin primer. In this procedure, the entire surface including the overlap zone is coated. After each treatment, the coating is dried and cured for 10 minutes at 120° C.

4. Salt spray test

The test sheets prepared in accordance with III.3. are stored in a salt spray test apparatus in accordance with DIN 50 021 for, for example, 500 hours. The test specimens are then dried for 3 hours at room temperature and the tensile shear strength is measured in accordance with III.2.

$$\text{Residual strength} = \frac{\text{tensile shear strength after salt spray test for, e.g., 500 hours}}{\text{tensile shear strength before the salt spray test}} \times 100\%$$

5. Preparation of the test specimens for measuring the peeling resistance

The test specimens are produced in accordance with DIN 53 281, Part 2, from steel sheet grade ST 1203 having a thickness of 0.5 mm. The steel strips are degreased with acetone and bent to an angle of 90° using a vice. Using a film drawing apparatus, a layer of 0.1 mm of the adhesive prepared in accordance with II. is applied to the outer surface of the longer shank. The metal strip thus coated with adhesive is then put together with a further metal strip not coated with adhesive to form a T-shaped test specimen which is symmetrical about the adhesive joint and which has an adhesively bonded area of 185×30 mm. The adhesive is cured in 30 minutes at 180° C. After cooling, adhesive exuded out the side is cut off.

6. Measurement of the peeling resistance

The peeling resistance of the test specimens produced in accordance with III.5. is determined in accordance with DIN 53 282 as the mean of 5 individual values on a tensile tester in accordance with DIN 51 221, Part 3, from Zwick.

Tensile sheer strength, peeling resistance and residual strength after a salt spray test are reported in Table 2.

TABLE 2

| Example | Tensile shear strength in accordance with DIN 53 283 N/mm² | Peeling resistance in accordance with DIN 53 282 N/mm | Residual strength after salt spray test (DIN 50 021) after 500 hours % |
|---|---|---|---|
| II.1. (Comparison) | 16.0 | 3.7 | 1.3 |
| II.2. | 16.1 | 8.5 | 100.0 |
| II.3. | 16.1 | 6.8 | 54.5 |
| II.5. | 16.6 | 7.8 | 97.6 |
| II.6. | 16.5 | 7.2 | 86.7 |

While the invention has been described in detail by reference to preferred embodiments and the foregoing examples, those skilled in the art will appreciate that various modifications can be made to the invention without departing significantly from the spirit and scope thereof. In addition, the disclosures of all of the aforementioned documents are incorporated by reference herein in their entirety.

What is claimed is:

1. An epoxy resin adhesive composition consisting essentially of:
   (A) a compound that contains at least two 1,2-epoxide groups and that is a reaction product of:
   (A1) a compound that contains at least two 1,2-epoxide groups per molecule, and
   (A2) a polyoxyalkylenemonoamine that has a number average molecular weight of between 130 and 700 and, optionally, one or both of
   (A3) a polyoxyalkylenemonoamine that has a number average molecular weight of from 900 to 5000, and
   (A4) a polycarboxylic acid, and
   (B) a hardener.

2. A composition as claimed in claim 1, additionally consisting essentially of at least one additive.

3. A composition as claimed in claim 1, wherein the compound (A1) has an epoxide equivalent weight between 150 and 250.

4. A composition as claimed in claim 1, wherein polyoxyalkylenemonoamine (A2) is a compound of the formula $$CH_3-O-CH_2-CH_2-[O-CH_2-CH-(CH_3)]_9-NH_2.$$

5. A composition as claimed in claim 1, wherein polyoxyalkylenemonoamine (A2) has a number average molecular weight of 600.

6. A composition as claimed in claim 1, wherein polycarboxylic acid (A4) comprises a dimeric fatty acid that has an acid number between 150 and 230 mg KOH/g.

7. A composition as claimed in claim 1, wherein polycarboxylic acid (A4) comprises a dicarboxylic acid of the formula $$HOOC-CH_2-[OR]_n-O-CH_2-COOH \quad (1),$$

where $R^1$ is an alkylene radical that has from 2 to 5 carbon atoms, and n is 0 or an integer from 1 to 300.

8. A composition as claimed in claim 7, wherein $R^1$ in formula (1) is an ethylene radical and n is an integer from 1 to 50.

9. A composition as claimed in claim 7, wherein polycarboxylic acid (A4) comprises polyglycol dicarboxylic acid that has a molecular weight of about 600.

10. A composition as claimed in claim 1, wherein the hardener comprises a latent hardener.

11. A composition as claimed in claim 1, wherein the hardener comprises dicyandiamide.

12. A composition as claimed in claim 1, wherein the hardener comprises N-aminoethylpiperazine.

13. A composition as claimed in claim 1, wherein the hardener comprises a mixture of N-aminoethylpiperazine and nonylphenol.

14. A composition as claimed in claim 3, wherein the additive comprises an accelerator.

15. A composition as claimed in claim 1, wherein polyoxyalkylenemonoamine (A2) comprises a polyoxypropylenemonoamine.

16. A composition as claimed in claim 1, wherein polyoxyalkylenemonoamine (A3) comprises a polyoxypropylenemonoamine.

17. An epoxy resin composition according to claim 1, consisting essentially of both a polyoxyalkylenemonoamine (A2) and a polyoxyalkylenemonoamine (A3).

18. An epoxy resin composition according to claim 17, additionally consisting essentially of a polycarboxylic acid (A4).

19. A composition as claimed in claim 1, wherein the compound (A1) is a polyoxypropylene glycol diglycidyl ether that has an epoxide equivalent weight of from 150 to 800 g/mol.

20. A composition as claimed in claim 1, wherein the compound (A1) is a polyoxypropylene glycol diglycidyl ether that has an epoxide equivalent weight of from 300 to 400.

21. A composition as claimed in claim 1, wherein polyoxyalkylenemonoamine (A2) has the formula $$CH_3-(O-CH_2-CH_2)_y-[O-CH_2-CH(CH_3)]_x-NH_2,$$

where, independently of one another, y is from 0 to 10 and x is from 1 to 41.

22. A composition as claimed in claim 1, wherein polyoxyalkylenemonoamine (A3) comprises a compound of the formula $$CH_3-(O-CH_2-CH_2)_y-[O-CH_2-CH(CH_3)]_x-NH_2,$$

where, independently of one another, y is from 0 to 10 and x is from 1 to 41.

23. A composition as claimed in claim 1, wherein polyoxyalkylenemonoamine (A2) has a molecular weight between about 500 and 700.

24. A composition as claimed in claim 1, comprising from 20 to 80% by weight of component (A2) and, optionally, from 20 to 50% by weight of component (A3) and from 0.1 to 30% by weight of the component (A4), based on component (A1).

* * * * *